(12) United States Patent
Homma (10) Patent No.: US 9,766,397 B2
(45) Date of Patent: Sep. 19, 2017

(54) OPTICAL FIBER AND OPTICAL FIBER RIBBON

(71) Applicant: SUMITOMO ELECTRIC INDUSTRIES, LTD., Osaka-shi, Osaka (JP)

(72) Inventor: Yuya Homma, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/188,097

(22) Filed: Jun. 21, 2016

(65) Prior Publication Data

US 2016/0377802 A1 Dec. 29, 2016

(30) Foreign Application Priority Data

Jun. 23, 2015 (JP) .................. 2015-125609

(51) Int. Cl.
  *G02B 6/44* (2006.01)
  *G02B 6/02* (2006.01)
  *G02B 6/028* (2006.01)
  *G02B 6/036* (2006.01)

(52) U.S. Cl.
  CPC ....... *G02B 6/02395* (2013.01); *G02B 6/0288* (2013.01); *G02B 6/03627* (2013.01); *G02B 6/4403* (2013.01)

(58) Field of Classification Search
  USPC ................................. 385/114, 124
  See application file for complete search history.

(56) References Cited

U.S. PATENT DOCUMENTS

| | | | |
|---|---|---|---|
| 5,644,670 A * | 7/1997 | Fukuda | G02B 6/0288 385/124 |
| 6,269,210 B1 * | 7/2001 | Yagi | G02B 6/4403 385/110 |
| 8,189,978 B1 | 5/2012 | Bennett et al. | |

FOREIGN PATENT DOCUMENTS

| | | |
|---|---|---|
| JP | 2001-194565 A | 7/2001 |
| JP | 2004-184881 A | 7/2004 |
| JP | 3902201 B2 | 4/2007 |

* cited by examiner

*Primary Examiner* — Eric Wong
(74) *Attorney, Agent, or Firm* — Drinker Biddle & Reath LLP

(57) ABSTRACT

An optical fiber comprises a glass fiber including a core and a cladding surrounding the core, a non-strippable resin layer that adheres to and covers a surface of the glass fiber, and a buffer layer that covers the non-strippable resin layer, when pullout force measurement in which a length of 10 mm of each of the glass fiber and the non-strippable resin layer is pulled out at a tensile speed of 5 mm/min from the buffer layer is performed, a pullout force at 23° C. is 1.0 kg or less and a pullout force at 95° C. is 0.50 kg or less.

9 Claims, 5 Drawing Sheets

OPTICAL FIBER AND OPTICAL FIBER RIBBON

TECHNICAL FIELD

The present invention relates to an optical fiber and an optical fiber ribbon.

The present application claims the priority based on Japanese Patent Application No. 2015-125609 filed on Jun. 23, 2015, and the entire content described in the Japanese Patent Application is incorporated.

BACKGROUND

Japanese Patent No. 3902201, Japanese Unexamined Patent Publication No. 2004-184881 and U.S. Pat. No. 8,189,978 disclose an optical fiber in which a non-strippable resin layer is disposed on the outer circumference of glass and the non-strippable resin diameter is approximately 125 μm. The optical fiber is formed so that a general-purpose optical connector can be used.

In all of Japanese Patent No. 3902201, Japanese Unexamined Patent Publication No. 2004-184881 and U.S. Pat. No. 8,189,978, the non-strippable resin layer and a buffer layer on the outer circumference thereof are each formed by curing an ultraviolet curing resin. In this case, an acrylate group of the non-strippable resin and an acrylate group of the buffer layer form a covalent bond by a radical reaction to exhibit a strong adhesion force. Thus, removal of a coating layer on the outer circumference of the non-strippable resin layer is difficult. Furthermore, in the case of a ribbon structure in which a plurality of fibers are arranged laterally in a row, it is more difficult to remove the coating layer in simultaneous removal of a ribbon coating material and the buffer layer, and a problem is that a coating residue is generated on the outer circumference of the non-strippable resin layer.

SUMMARY

An object of the present invention is to provide an optical fiber and an optical fiber ribbon that are not ruptured even when bent for a long period so as to be small in bending radius (for example, 7.5 mm) and that is excellent in coating removability of a coating layer.

An optical fiber according to one embodiment of the present invention comprises a glass fiber including a core and a cladding surrounding the core, a non-strippable resin layer that adheres to and covers a surface of the glass fiber, and a buffer layer that covers the non-strippable resin layer, wherein when pullout force measurement in which a length of 10 mm of each of the glass fiber and the non-strippable resin layer is pulled out at a tensile speed of 5 mm/min from the buffer layer is performed, a pullout force at 23° C. is 1.0 kg or less and a pullout force at 95° C. is 0.50 kg or less.

An optical fiber for use in the interconnection field is used under a severer environment than an optical fiber for use in a trunk line system. For example, in wiring between instruments or wiring in an instrument, there is demanded for a fatigue resistance in which an optical fiber is hardly ruptured even when the optical fiber is subjected to bending at a radius of 7.5 mm or less for a long period.

In order to achieve a good fatigue resistance, it is effective to reduce the glass diameter of an optical fiber. The glass diameter of a common optical fiber is 125 μm. An optical fiber having a glass diameter of less than 125 μm is improved in fatigue resistance as compared with a common optical fiber. The glass diameter of such a thin optical fiber, however, is too small relative to the diameter (around 127 μm) of a hole which is opened in a general-purpose optical connector and through which an optical fiber is to be inserted, and therefore the center of the thin optical fiber is easily deviated from the center of the hole of the connector when the thin optical fiber is attached to the connector. An optical axis is thus deviated at the end surface of the connector, causing no signal light to be transmitted.

The optical fiber of the present invention is not ruptured even when bent for a long period so as to be small in bending radius, and therefore is suitable for use in wiring between instruments or wiring in an instrument. The optical fiber and the optical fiber ribbon of the present invention can allow a coating layer adhering to glass to remain, to easily remove a coating layer thereon. When such a adhesion layer is allowed to correspond to the diameter of an optical fiber attachment hole of the general-purpose optical connector, the center of the optical fiber is not deviated from the center of the hole of the connector in attachment of the optical fiber of the present invention to the general-purpose optical connector. The loss of signal light due to misalignment of the optical axis at the end surface of the connector is small.

BRIEF DESCRIPTION OF THE DRAWINGS

FIG. 1A is a view illustrating an example of an optical fiber B1 of the present embodiment, and FIG. 1B is a view illustrating an example of an optical fiber B2 of the present embodiment;

FIG. 3A illustrates a refractive index profile C1, and FIG. 3B illustrates a refractive index profile C2;

FIGS. 4A, 4B and 4C are each a view describing a measurement method of the adhesion force between a non-strippable resin layer and a buffer layer.

DETAILED DESCRIPTION

Description of Embodiment of the Present Invention

First, the content of an embodiment of the present invention is recited and described. An optical fiber according to one embodiment of the present invention comprises a glass fiber including a core and a cladding surrounding the core, a non-strippable resin layer that adheres to and covers the surface of the glass fiber, and a buffer layer that covers the non-strippable resin layer, when pullout force measurement in which a length of 10 mm of each of the glass fiber and the non-strippable resin layer is pulled out at a tensile speed of 5 mm/min from the buffer layer is performed, the pullout force at 23° C. is 1.0 kg or less and the pullout force at 95° C. is 0.50 kg or less.

When the optical fiber is connected to a connector or the like, it is used with the buffer layer at the tip being removed and the non-strippable resin layer being not removed from the cladding. In the optical fiber of the present embodiment, the adhesion force between the non-strippable resin layer and the buffer layer can be controlled to thereby easily remove the buffer layer as a coating layer.

It is preferable that the pullout force at 23° C. be 0.70 kg or less and the pullout force at 95° C. be 0.30 kg or less. This makes it possible to more easily remove the buffer layer.

It is preferable in the optical fiber that the buffer layer include a primary layer and a secondary layer, the primary layer be formed by curing an ultraviolet curing resin composition containing an oligomer, a monomer and a photoinitiator, and the ultraviolet curing resin composition contain 30% by mass or more of a one-end-capped oligomer, based on the amount of the entire oligomer. While a general oligomer often has an acrylate group at each of both terminals, an oligomer having an acrylate group at only one terminal can be contained to thereby decrease the reaction point with an acrylate group of the non-strippable resin layer, resulting in a reduction in pullout force.

It is preferable from the viewpoint of a further reduction in pullout force that the ultraviolet curing resin composition contain 60% by mass or more of the one-end-capped oligomer, based on the amount of the entire oligomer.

It is preferable that the Young's modulus of the non-strippable resin layer be 600 MPa or more at 23° C. The Young's modulus can be 600 MPa or more to thereby prevent the non-strippable resin layer from being deformed in an optical connector, prevent the optical axis from being deviated and prevent an increase in loss from occurring, even under a wet heat environment (for example, 85° C., 85% RH).

In addition, it is generally known that a small glass diameter deteriorates lateral pressure property (microbend property). It is preferable that the Young's modulus of the primary layer be 0.5 MPa or less at 23° C. The Young's modulus of the primary layer can be reduced to result in an improvement in microbend property.

It is preferable from the viewpoint of a more improvement in microbend property of the optical fiber that the Young's modulus of the primary layer be 0.3 MPa or less at 23° C.

It is preferable in the optical fiber that the glass fiber be a multimode fiber having a trench portion disposed between the core and the cladding, the diameter of the core be 40 to 60 μm, the outer diameter of the cladding be 90 to 110 μm, the outer diameter of the non-strippable resin layer be 122 to 128 μm, the relative refractive index difference Δcore of the core be 0.7% or more, the relative refractive index difference Δtrench of the trench be −0.2% or less and the width of the trench be 1 μm or more.

The optical fiber of the present embodiment can be applied to a single mode fiber or a multimode fiber, but is preferably a multimode fiber that is large in core diameter and that has an advantage in mounting accuracy. It is preferable from the viewpoint of reductions in bending loss (macrobend) and microbend loss that the outer circumference of the core have a trench portion. While the glass fiber diameter (outer diameter of cladding) of a common optical fiber is 125 μm, the diameter can be reduced to 90 to 110 μm to thereby allow the optical fiber to be hardly ruptured in bending to a small radius. In addition, a non-strippable resin diameter of 122 to 128 μm can allow a common optical connector to be used.

It is further preferable that the Δtrench be −0.4% or less. This can allow the bending loss and the microbend loss of the optical fiber to be further reduced.

In an optical fiber ribbon according to one embodiment of the present invention, a plurality of the optical fibers are arranged laterally in a row and each of the optical fibers is covered with a ribbon material. The ribbon can be formed to thereby allow a large number of the optical fibers to be handled at the same time, for example, allow workability of mounting to an MT connector to be enhanced. The optical fiber of the present embodiment can be used and therefore the buffer layer can be easily removed together with the ribbon material.

Detail of Embodiment of the Present Invention

Specific examples of an optical fiber according to an embodiment of the present invention and a production method thereof are described below with reference to the drawings. Herein, the present invention is not limited to these examples, and is intended to be represented by the claims and to encompass all modifications within the meaning and the scope equivalent to the claims. In the following description, the same element in the description of the drawings is represented by the same symbol, and overlapping description is omitted.

(Optical Fiber)

Figure 1A:
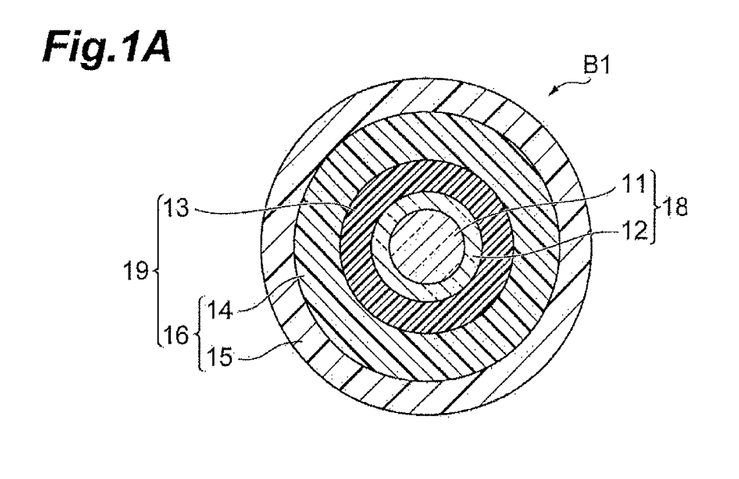
FIGS. 1A and 1B are each a schematic cross-sectional view illustrating a structure example of an optical fiber of the present embodiment.
Figure 1B:
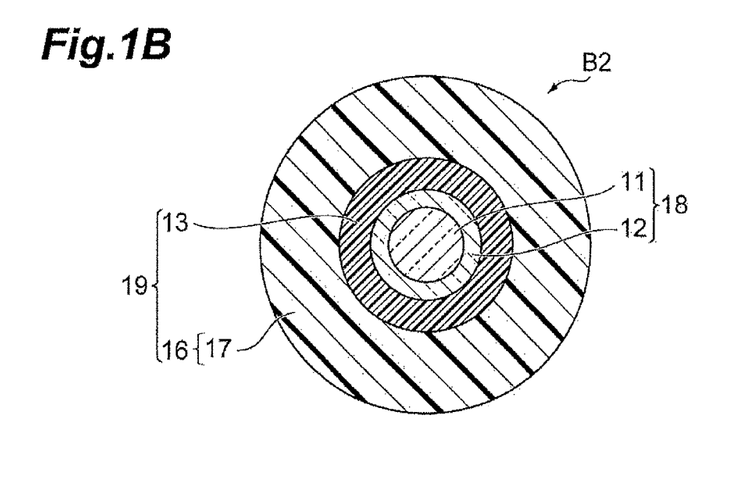

FIGS. 1A and 1B are each a schematic cross-sectional view illustrating a structure example of the optical fiber according to the present embodiment. FIGS. 1A and 1B are views illustrating structure examples of cross sections perpendicular to the axis directions of optical fibers B1 and B2 of the present embodiment, respectively. The optical fibers B1 and B2 each comprise a glass fiber 18 including a core 11 and a cladding 12, and a resin layer 19 including a non-strippable resin layer 13 and a buffer layer 16. The core 11 and the cladding 12 mainly include glass, and the cladding 12 surrounds the core 11. The detail structure of the glass fiber 18 is described later (see FIGS. 3A and 3B). The non-strippable resin layer 13 adheres to and covers the surface of the glass fiber 18 (the surface of the cladding 12 in the present embodiment), and the non-strippable resin layer 13 is not removed even in connection of a connector, and the like. In the optical fiber B1, the non-strippable resin layer 13 is covered with a flexible primary layer 14 and a rigid secondary layer 15. The primary layer 14 and the secondary layer 15 constitute the buffer layer 16. In the optical fiber B2, the non-strippable resin layer 13 is covered with a coating resin layer 17. The coating resin layer 17 is a single layer and constitutes the buffer layer 16. Thus, the buffer layer 16 may be made of a single layer such as the coating resin layer 17 or may be made of a plurality of layers such as the primary layer 14 and the secondary layer 15, for example. Herein, in order to impart distinguishability, a colored layer (ink layer, not illustrated) may also be formed on the outer circumference of the secondary layer.

The core 11 and the cladding 12 include glass such as silica glass. Silica glass to which germanium is added can be used for the core 11, and pure silica glass, or silica glass to which fluorine is added can be used for the cladding 12.

Figure 3A:
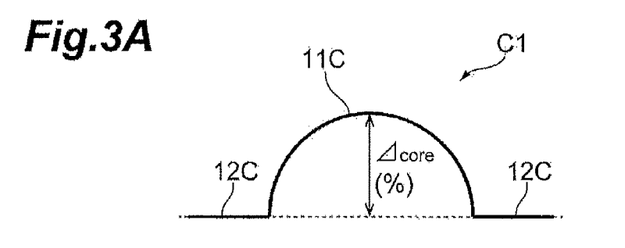
FIGS. 3A and 3B are each a view illustrating one example of a refractive index profile of a glass fiber.
Figure 3B:
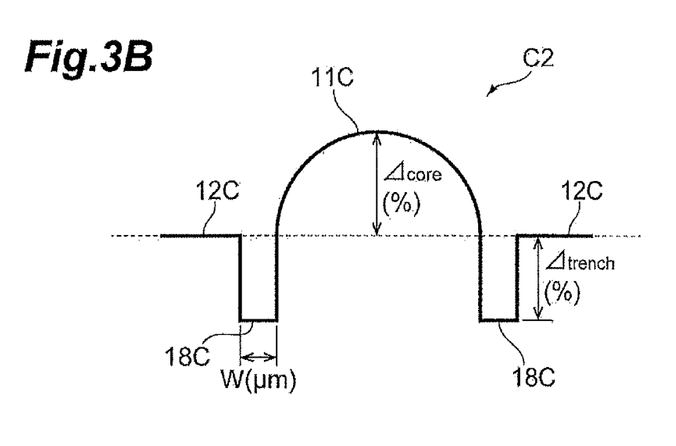

FIGS. 3A and 3B are each a view illustrating an example of a refractive index profile of the glass fiber. A refractive index profile C1 in FIG. 3A is a GI (Graded Index) type refractive index profile. The GI profile has a core refractive index distribution 11C as the refractive index distribution of the core 11 and a cladding refractive index distribution 12C as the refractive index distribution of the cladding 12. The cladding refractive index distribution 12C is adjacently placed on the circumference of the core refractive index distribution 11C, and is smaller in refractive index than the core refractive index distribution 11C. A refractive index profile C2 in FIG. 3B has a structure in which a trench portion 18C is adjacent to the core refractive index distribution 11C. The trench portion 18C is a portion that has a width W of about several μm in the radius direction and that is smaller in refractive index than the cladding refractive index distribution 12C. A refractive index profile having a trench portion can be obtained to result in reductions in bending loss (macrobend) and microbend loss. The refractive index profile in FIG. 3A may be adopted in an application where communication may be restored by release of bending even if a communication error occurs in bending to a small radius. The refractive index profile in FIG. 3B, having a trench, is preferable for an application where no communication error should occur even in bending to a small radius.

It is preferable that the diameter of the core 11 (core diameter) be in the range from 40 to 60 μm and the outer diameter of the cladding (cladding diameter) be in the range from 90 to 110 μm. In addition, the relative refractive index difference score of the core 11 is preferably 0.7% or more, more preferably 0.7 to 1.2%. In the case where the glass fiber 18 is a multimode fiber having a trench portion disposed between the core 11 and the cladding 12, the relative refractive index difference Δtrench of the trench is preferably −0.2% or less, more preferably −0.4% or less. The lower limit of the Δtrench can be −0.8%. In addition, the width of the trench portion 18C is preferably 1 μm or more, more preferably 1 to 9 μm.

The non-strippable resin layer 13 is a resin layer that strongly adheres to the cladding 12, and when the optical fiber B1 or B2 is connected to a connector or the like, it is used with the buffer layer 16 at the tip being removed and the non-strippable resin layer 13 being not removed from the cladding 12.

Figure 4A:
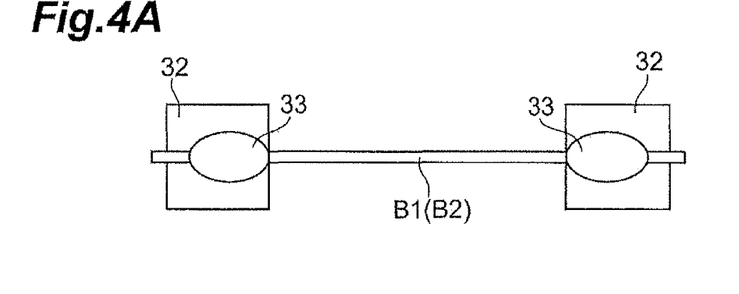
FIG. 4A is a plan view of an optical fiber that adheres to mat boards.
Figure 4B:
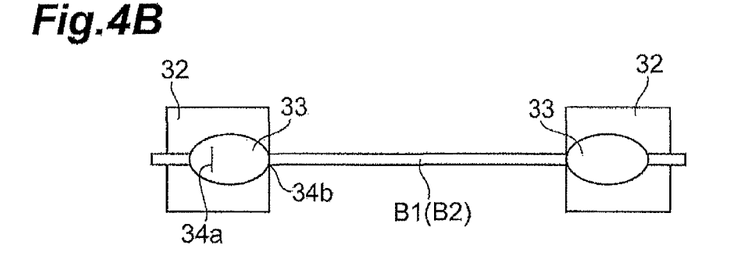
FIG. 4B is a plan view of a cutting portion formed.
Figure 4C:
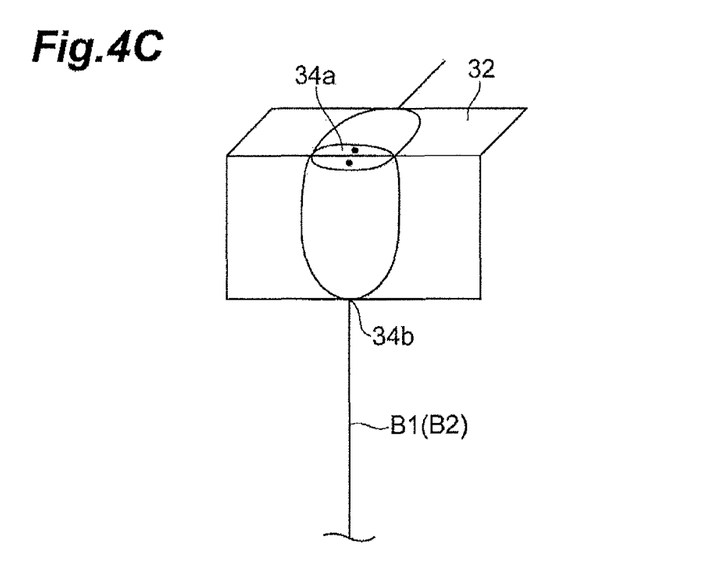
FIG. 4C is a perspective view of the cutting portion bent.

The pullout force represents the adhesion force between the non-strippable resin layer 13 and the buffer layer 16. FIGS. 4A, 4B and 4C are views describing the method of measuring the adhesion force between the non-strippable resin layer 13 and the buffer layer 16 with respect to the optical fiber B1. In the present embodiment, the adhesion force is evaluated by pullout force measurement in which, a length of 10 mm of each of the glass fiber 18 and the non-strippable resin layer 13 is pulled out at a tensile speed of 5 mm/min from the buffer layer 16. Herein, the measurement method described in Japanese Unexamined Patent Publication No. 2001-194565 can be adopted for the pullout force measurement. FIG. 4A is a plan view of the optical fiber that adheres to mat boards 32, FIG. 4B is a plan view of a cutting portion formed, and FIG. 4C is a perspective view of the cutting portion bent.

In measurement of the pullout force, a length of 10 mm of each of the optical fiber B1 and the mat board 32 is first prepared. Next, as illustrated in FIG. 4A, in the state where both ends of the optical fiber B1 are slightly protruded from respective mat boards 32, both ends of the optical fiber B1 are secured to the respective mat boards 32 by adhesion members 33. Here, the positions of the edges of the adhesion members 33 are each allowed to correspond to one side of the interior (the center of the optical fiber B1) of each of the mat boards 32. For the adhesion members 33, one that is not easily deformed when cured, specifically, for example, "gel Aron Alfa (registered trademark)" produced by Toagosei Co., Ltd. is used.

After the mat boards 32 are secured to the optical fiber B1, the adhesion member 33 and the optical fiber B1 are cut at a cutting portion 34a positioned at a proper distance from the one side of one of the mat boards 32, as illustrated in FIG. 4B. Along therewith, only the buffer layer 16 of the optical fiber B1 is cut at a cutting portion 34b positioned on one side of the interior of one of the mat boards 32. Here, the cutting is certainly performed by bending the mat board 32 at an angle of 90 degrees at the cutting portion 34a, as illustrated in FIG. 4C. There is paid attention to the following: only the buffer layer 16 of the optical fiber B1 is cut and the non-strippable resin layer 13 is not damaged at the cutting portion 34b.

The mat boards 32 at both ends of the optical fiber B1 are each chucked by a testing apparatus. There is paid attention to the following: chucking between the cutting portion 34a and the cutting portion 34b is not made. The mat boards 32 are mutually pulled away at a rate of 5 mm/min in measurement of the pullout force, and as a result, the non-strippable resin layer 13 located between the cutting portion 34a and the cutting portion 34b, and a member (glass fiber 18) located more inside are pulled out from the buffer layer 16. The mat boards 32 are mutually pulled away continuously until a member such as the non-strippable resin layer 13 is completely pulled out from the buffer layer 16, and the maximum value of the resistance force to pullout measured here is defined as the pullout force.

In addition, a measurement portion may be located in a constant-temperature chamber to thereby allow the temperature to be changed to measure the pullout force. When the pullout forces at 23° C. and 95° C. are measured, a measurement sample is loaded in the constant-temperature chamber and stabilized for 10 minutes after the temperature reaches a desired temperature, and thereafter the measurement is performed.

Figure 2:
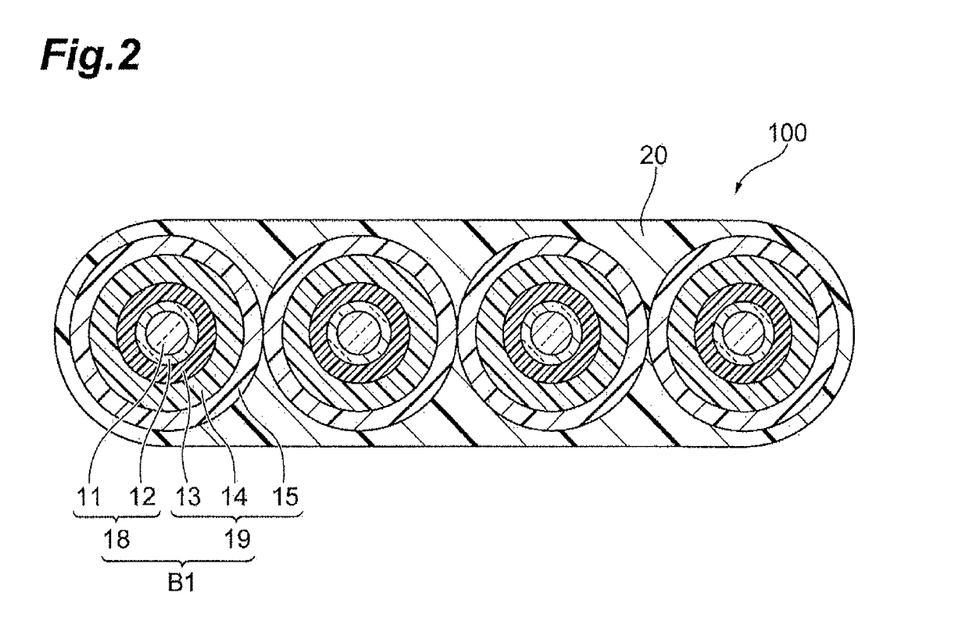
FIG. 2 is one example of a schematic cross-sectional view illustrating a structure example of an optical fiber ribbon of the present embodiment.

The optical fiber of the present embodiment may be used as a single fiber as illustrated in FIGS. 1A and 1B, or may be used in the form of a ribbon as illustrated in FIG. 2 described later. When the optical fiber is used as a single fiber, the buffer layer 16 may be removed at a room temperature or may be removed by use of a heating remover. When the optical fiber is used as a ribbon, the buffer layer 16 is generally removed by use of a heating remover. In order that the buffer layer does not remain on the non-strippable resin layer in removing of a coating of a single fiber at a room temperature, the pullout force at 23° C. is importantly 1.0 kg or less, preferably 0.7 kg or less. In addition, in order that the buffer layer does not remain on the non-strippable resin layer in removing of a coating of a ribbon fiber at a high temperature, the pullout force at 95° C. is importantly 0.50 kg or less, preferably 0.30 kg or less. The lower limit of the pullout force at 23° C. can be about 0.20 kg, and the lower limit of the pullout force at 95° C. can be about 0.03 kg.

It is preferable that the outer diameter of the non-strippable resin layer 13 (non-strippable resin diameter) be in the range from 120 to 128 μm. In addition, the Young's modulus of the non-strippable resin layer 13 is preferably 600 MPa or more, more preferably 1000 MPa or more at 23° C. The upper limit of the Young's modulus of the non-strippable resin layer is not particularly limited and is about 2000 MPa. When the Young's modulus of the non-strippable resin layer 13 is 600 MPa or more, the non-strippable resin layer is hardly deformed in a connector and the axis of the optical fiber is hardly deviated, thereby allowing optical property to be easily enhanced.

When the buffer layer 16 includes the primary layer 14 and the secondary layer 15, the outer diameter of the primary layer 14 (primary diameter) is usually about 180 to 210 μm and the outer diameter of the secondary layer 15 (secondary diameter) is usually about 220 to 260 μm.

The Young's modulus of the primary layer 14 is preferably 0.5 MPa or less, more preferably 0.3 MPa or less at 23° C. from the viewpoint of making lateral pressure property further good. The lower limit of the Young's modulus of the primary layer 14 is not particularly limited, and is about 0.05 MPa.

The Young's modulus of the primary layer 14 can be measured by a Pullout Modulus test at 23° C. Specifically, an incision is made by a razor or the like until it reaches the primary layer of the optical fiber, to partially remove the primary layer 14 and the secondary layer 15 serving as the buffer layer 16, and a portion where the buffer layer 16 is not removed is secured to pull out the glass fiber 18 and the non-strippable resin layer 13. The Young's modulus of the primary layer 14 is determined from the amount of the primary layer 14 elastically deformed before the glass fiber 18 and the non-strippable resin layer 13 are pulled out, and the force that pulls the glass fiber 18 and the non-strippable resin layer 13.

The Young's modulus of the secondary layer 15 is preferably 400 to 1500 Mpa, more preferably 600 to 1200 MPa at 23° C.

The measurement method of the Young's modulus of the secondary layer is as follows. That is, the optical fiber is first immersed in a solvent, and only the buffer layer is extracted in a cylindrical shape. Next, the solvent is removed by vacuum drying, and thereafter a tensile test (the tensile speed is 1 mm/min) is performed in a constant temperature room at 23° C. The Young's modulus can be then determined by a secant expression at 2.5% strain. While the buffer layer includes the primary layer and the secondary layer, the Young's modulus of the primary layer is very low as compared with the Young's modulus of the secondary layer and therefore is ignorable. In addition, the Young's modulus of the non-strippable resin layer can be determined by the same method as in the buffer layer by immersing the optical fiber, from which the buffer layer is removed, in a solvent to thereby extract the non-strippable resin layer in a cylindrical shape.

It is preferable that the number of apertures (NA) of the optical fiber of the present embodiment be 0.15 to 0.30. The NA can be in the range to result in a reduction in coupling loss with a light receiving portion such as a light source (for example, VCSEL) or a photodiode.

(Ultraviolet Curable Resin Composition)

In the present embodiment, the non-strippable resin layer 13 and the buffer layer 16 (primary layer 14 and secondary layer 15, or coating resin layer 17) can be formed by curing, for example, an ultraviolet curable resin composition containing an oligomer, a monomer and a photopolymerization initiator.

Examples of the oligomer include urethane (meth)acrylate and epoxy (meth)acrylate, and it is preferable to use urethane (meth)acrylate. The oligomer can be used as a mixture of two or more.

Examples of the urethane (meth)acrylate include one obtained by reacting a polyol compound, a polyisocyanate compound and a hydroxyl group-containing acrylate compound. Examples of the polyol compound include polytetramethylene glycol, polypropylene glycol, and a bisphenol A-ethylene oxide adduct diol. Examples of the polyisocyanate compound include 2,4-tolylene diisocyanate, 2,6-tolylene diisocyanate and isophorone diisocyanate. Examples of the hydroxyl group-containing acrylate compound include 2-hydroxy (meth)acrylate, 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol di(meth)acrylate. For the epoxy (meth)acrylate, for example, one obtained by reacting an epoxy compound with (meth) acrylic acid can be used.

The term "(meth)acrylate" means acrylate or methacrylate corresponding thereto. Much the same is true on (meth) acrylic acid.

The ultraviolet curable resin composition for forming the primary layer preferably includes 30% by mass or more, more preferably 60% by mass or more of a one-end-capped oligomer, based on the amount of the entire oligomer. The one-end-capped oligomer is here a compound in which only one terminal of the oligomer is a reactive terminal, namely, a compound that has one polymerizable group at one terminal of the oligomer. It is preferable that the reactive terminal of the one-end-capped oligomer be a hydroxyethyl (meth)acrylate residue, and it is preferable that a lower alcohol having 5 or less carbon atoms or a silane coupling agent be bound to the non-reactive terminal. As the silane coupling agent, a silane coupling agent having a functional group such as an amino group, an epoxy group or a mercapto group can be used. When the one-end-capped oligomer is used, not only the pullout force can be reduced, but also the crosslinking density of the primary layer itself can be reduced and therefore the Young's modulus can be reduced to improve microbend property.

As the monomer, a monofunctional monomer having one polymerizable group or a polyfunctional monomer having two or more polymerizable groups can be used. The monomer can be used as a mixture of two or more.

Examples of the monofunctional monomer include N-vinyl monomers having a cyclic structure, such as N-vinylpyrrolidone, N-vinylcaprolactam or (meth)acryloylmorpholine; and (meth)acrylate compounds such as isobornyl (meth) acrylate, tricyclodecanyl (meth)acrylate, benzyl (meth)acrylate, dicyclopentanyl (meth)acrylate, 2-hydroxyethyl (meth) acrylate, nonylphenyl (meth)acrylate, phenoxyethyl (meth) acrylate and polypropylene glycol mono(meth)acrylate. Among them, N-vinyl monomers having a cyclic structure are preferable from the viewpoint of an enhancement in curing speed.

Examples of the polyfunctional monomer include polyethylene glycol di(meth)acrylate, tricyclodecanediyl dimethylene di(meth)acrylates, bisphenol A-ethylene oxide adduct diol di(meth)acrylate and trimethylolpropane tri (meth)acrylate.

As the photopolymerization initiator, one appropriately selected from known radical photopolymerization initiators can be used. Examples of the photopolymerization initiator include 1-hydroxycyclohexyl phenyl ketone, 2,2-dimethoxy-2-phenylacetophenone, 1-(4-isopropylphenyl)-2-hydroxy-2-methylpropane-1-one, 2,4,4-trimethyl pentyl phosphine oxide, 2,4,4-trimethylbenzoyl diphenylphosphine oxide, 2-methyl-1-[4-(methylthio)phenyl]-2-morpholinopropane-1-one (Irgacure 907, produced by Ciba Specialty Chemicals Inc.) and 2,4,6-trimethylbenzoyl diphenylphosphine oxide (Lucirin TPO, produced by BASF SE). The photopolymerization initiator may be used as a mixture of two or more.

The ultraviolet curable resin composition may include a silane coupling agent, an antioxidant, a photoacid generator, a photosensitizer, a photostabilizer, and the like. In particular, a resin composition that forms the non-strippable resin layer that covers the glass fiber preferably includes a silane coupling agent, more preferably contains a photoacid generator as a reaction promotor of a silane coupling agent.

(Optical Fiber Ribbon)

A ribbon can be produced by using the optical fiber of the present embodiment. FIG. 2 is a schematic cross-sectional view illustrating one example of an optical fiber ribbon according to the present embodiment. An optical fiber ribbon 100 illustrated in FIG. 2 is a ribbon in which a plurality (4 here) of the optical fibers B1 arranged in parallel are integrated by a ribbon material 20. While FIG. 2 illustrates an example of a ribbon of 4 fibers, any number of optical fibers, such as 2 fibers, 6 fibers, 8 fibers, 12 fibers or 24 fibers may be freely selected. In addition, in order to impart distinguishability, an optical fiber having an ink layer may be used on the outer circumference of the secondary layer to produce a ribbon. The ribbon material 20 is formed by, for example, an epoxy (meth)acrylate resin or a urethane (meth) acrylate resin.

Examples

Hereinafter, the results of evaluation tests with Examples and Comparative Examples according to the present invention are shown and the present invention is described in more detail. Herein, the present invention is not intended to be limited to these Examples.

[Preparation of Resin Composition]
(Primary Resin Composition)

| Urethane acrylate oligomer having composition shown in Table 1 below | 65 parts by mass |
|---|---|
| Ethoxynonylphenol acrylate | 5 parts by mass |
| Isobornyl acrylate | 20 parts by mass |
| N-Vinylcaprolactam | 6 parts by mass |
| Photopolymerization initiator: 2,4,4-trimethylbenzoyl diphenylphosphinoxide | 1 part by mass |
| 3-Acryloxypropyl trimethoxysilane | 1 part by mass |
| Antioxidant: Irganox 1035 | 0.8 parts by mass |
| Photostabilizer: 2-hydroxy-4-methoxybenzophenone | 0.2 parts by mass |

TABLE 1

| Urethane acrylate oligomer | A | B | C | D | E | F |
|---|---|---|---|---|---|---|
| One-end-capped oligomer (% by mass) | 100 | 80 | 60 | 30 | 20 | 0 |
| Both-ends-reactive oligomer (% by mass) | 0 | 20 | 40 | 70 | 80 | 100 |
| Number average molecular weight | 4500 | 4500 | 4500 | 4500 | 4500 | 4500 |

The one-end-capped oligomer has a structure represented by "H—(I-polypropylene glycol)2-I-MeOH", and the both-ends-reactive oligomer has a structure represented by "H—(I-polypropylene glycol)2-I—H". In designation of the oligomers, "H" represents a hydroxyethyl acrylate residue, "I" represents an isophorone diisocyanate residue, "MeOH" represents a methanol residue, and "polypropylene glycol" represents a polypropylene glycol residue.

(Secondary Resin Composition)

| Urethane acrylate oligomer obtained by reacting diisocyanate and hydroxy acrylate with polypropylene glycol | 50 parts by mass |
|---|---|
| Bisphenol A type epoxy acrylate | 18 parts by mass |
| Isobornyl acrylate | 10 parts by mass |
| N-vinylpyrrolidone | 5 parts by mass |
| Ethoxylated nonylphenyl acrylate | 15 parts by mass |
| Photopolymerization initiator: 2,4,4-trimethylbenzoyl diphenylphosphinoxide | 2 parts by mass |

(Non-Strippable Resin Composition)

| Urethane acrylate oligomer obtained by reacting diisocyanate and hydroxy acrylate with polypropylene glycol | 50 parts by mass |
|---|---|
| Bisphenol A type epoxy acrylate | 10 parts by mass |
| Isobornyl acrylate | 37 parts by mass |
| Photopolymerization initiator: 2,4,4-trimethylbenzoyl diphenylphosphinoxide | 2 parts by mass |
| 3-Acryloxypropyl trimethoxysilane | 1 part by mass |

[Production of Optical Fiber]

A glass fiber that was configured from a core (diameter: 50 μm) and a cladding (diameter: 100 μm) and that had a refractive index profile shown in Table 2 below was prepared. Next, a non-strippable resin composition was used to form a non-strippable resin layer (diameter: 125 μm) on the outer circumference of the glass fiber, and furthermore a primary resin composition was used to form a primary layer (diameter: 200 μm) and a secondary resin composition was used to form a secondary layer (diameter: 245 μm), on the outer circumference thereof, to produce an optical fiber.

TABLE 2

| Refractive index profile | A | B | C |
|---|---|---|---|
| Structure | FIG. 3A | FIG. 3B | FIG. 3B |
| Δcore | 1.00% | 1.00% | 1.00% |
| Δtrench | — | −0.45% | −0.20% |
| Trench width | — | 6 μm | 3 μm |

[Production of Optical Fiber Ribbon]

After a colored layer (diameter colored: 255 μm) was provided on the outer circumference of the secondary layer of the optical fiber produced above, 4 of the fibers were arranged laterally in a row and covered with a ribbon material to produce an optical fiber ribbon.

[Evaluation of Optical Fiber and Ribbon]

The optical fiber and the ribbon produced were subjected to the following evaluation tests. The results are shown in Table 3 and Table 4.

<Young's Modulus of Primary Layer>

Measurement was performed by the Pullout Modulus test at 23° C. Specifically, an incision was made by a razor or the like until it reached the primary layer of the optical fiber, to remove the primary layer and the secondary layer, and a portion from which coating was not removed was secured to pull out the glass optical fiber or the optical fiber provided with the non-strippable resin layer. The stress of the primary layer was determined from the amount of the primary layer elastically deformed before the glass optical fiber or the optical fiber provided with the non-strippable resin layer was pulled out, and the force that pulled the glass optical fiber or the optical fiber provided with the non-strippable resin layer.

<Pullout Force>

The pullout forces at 23° C. and 95° C. were evaluated by the above method. A case where the pullout force at 23° C. was 0.7 kg or less was rated as A, a case where the pullout force was more than 0.7 kg and 1.0 kg or less was rated as B, a case where the pullout force was more than 1.0 kg was rated as C, and rating of B or better was defined as "passed". Similarly, a case where the pullout force at 95° C. was 0.3 kg or less was rated as A, a case where the pullout force was more than 03 kg and 0.5 kg or less was rated as B, a case where the pullout force was more than 0.5 kg was rated as C, and rating of B or better was defined as "passed".

<Coating Removability of Single Fiber>

After the buffer layer was removed from the optical fiber (single fiber) at 23° C. by use of a jacket remover "JR-25" manufactured by Sumitomo Electric Industries, Ltd., coating residue on the non-strippable resin layer was wiped off by Kimwipe (manufactured by Nippon Paper Crecia Co., Ltd.) wetted with ethanol. A case where coating residue was removed at one time was rated as A, a case where coating residue was removed at 2 to 3 times was rated as B, a case where coating residue was removed at 4 or more times or coating residue was not removed was rated as C, and rating of B or better was defined as "passed".

<Simultaneous Removability of Ribbon>

After the buffer layer and the ribbon material were simultaneously removed from the ribbon of 4 fibers at 95° C. by use of a hot jacket remover "JR-6" manufactured by Sumitomo Electric Industries, Ltd., coating residue on the non-strippable resin layer was wiped off by Kimwipe (manufactured by Nippon Paper Crecia Co., Ltd.) wetted with ethanol. A case where coating residue was removed at one time was rated as A, a case where coating residue was removed at 2 to 3 times was rated as B, a case where coating residue was removed at 4 or more times or coating residue was not removed was rated as C, and rating of B or better was defined as "passed".

With respect to evaluation of microbend property and macrobend property described below, measurements were performed by connecting MC-FC-50-S manufactured by Arden Photonics Ltd. to an LED with an emission wavelength of 850 nm, and allowing light to enter the optical fiber to be measured, under the condition according to IEC61280-4-1.

<Lateral Pressure Resistance (Microbend Property)>

Figure 5A:
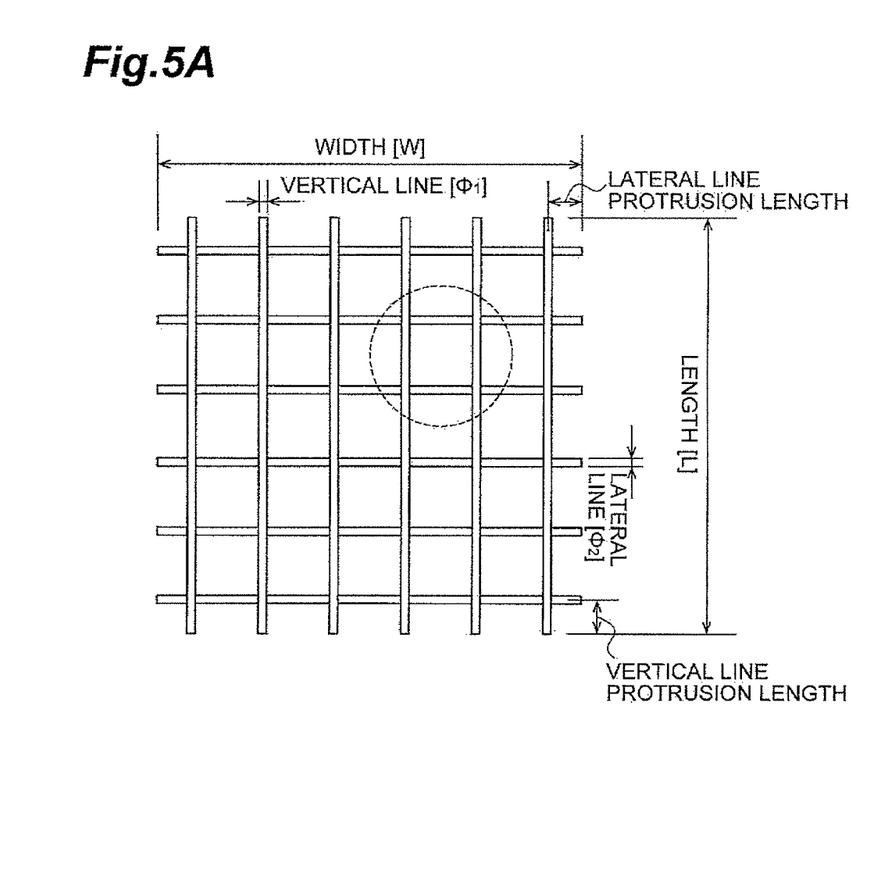
FIG. 5A is a view illustrating a configuration of a metal mesh material for use in a lateral pressure test.
Figure 5B:
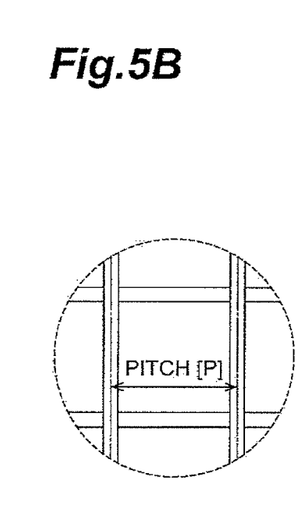
FIG. 5B is a partial enlarged view of FIG. 5A.

FIG. 5A is a view illustrating a configuration of a metal mesh material 30 for use in a lateral pressure test, and FIG. 5B is a partial enlarged view of FIG. 5A. As illustrated in FIGS. 5A and 5B, the metal mesh material 30 has a mesh shape in which a plurality of metal lines are laid vertically and laterally. The vertical line diameter $\phi 1$ and the lateral line diameter $\phi 2$ are each 50 µm, and the pitch P between the central line of each vertical line and the central line of each lateral line is 150 µm. The vertical line protrusion length L1 is 100 µm, and the lateral line protrusion length L2 is 100 µm.

The microbend property of the optical fiber was evaluated by a lateral pressure test. The lateral pressure test was performed by winding the optical fiber, for example, at a tensile force of 80 g, around a bobbin with a body around which the metal mesh material 30 illustrated in FIGS. 5A and 5B was wound without a clearance, and thereafter determining the difference between the transmission loss value in the state where the optical fiber was wound around the bobbin and the transmission loss value in the state after bundling (the state where the optical fiber was taken out from the bobbin). As the light source, one outputting white light was used. An excitation optical fiber having substantially the same structure as the optical fiber and having a length of 1000 m was provided between this white light source and the optical fiber. The light output from the white light source was then input to the input terminal of the excitation optical fiber, a high-order mode was sufficiently attenuated while the light transmitted the excitation optical fiber, and base mode light output from the excitation optical fiber was input to the input terminal of the optical fiber. The power of light with a wavelength of 850 nm among light output from the output terminal of the optical fiber was measured to thereby determine the transmission loss value in the state where the optical fiber was wound around the bobbin.

A case where the difference in transmission loss obtained by subtracting, from the transmission loss in winding the optical fiber around the bobbin at a tensile force of 80 g, the transmission loss in not winding the optical fiber around the bobbin but rounding it in a bundle of R 30 cm or more was less than 3.0 dB/km was rated as A, a case where the difference was 3.0 or more and less than 8.0 was rated as B, a case where the difference was 8.0 or more was rated as C, and rating of B or better was defined as "passed".

<Bending Loss Measurement (Macrobend Property)>

The transmission loss in winding the optical fiber around a mandrel of $\phi 15$ mm for 2 turns (R 7.5 mm×2 turns) was determined. A case where the transmission loss was less than 0.1 dB was rated as A, a case where the transmission loss was 0.1 dB or more and less than 0.2 dB was rated as B, and a case where the transmission loss was 0.2 dB or more was rated as C. Rating of B or better was then defined as an acceptable value.

TABLE 3

|  |  | Unit | Example 1 | Example 2 | Example 3 | Example 4 | Example 5 | Example 6 |
|---|---|---|---|---|---|---|---|---|
| Urethane acrylate oligomer of primary resin composition (see Table 1) | | — | B | A | B | C | D | B |
| Refractive index profile (see Table 2) | | — | A | B | B | B | B | C |
| Core diameter | | µm | 50 | 50 | 50 | 50 | 50 | 50 |
| Cladding diameter | | µm | 100 | 100 | 100 | 100 | 100 | 100 |
| Non-strippable resin diameter | | µm | 125 | 125 | 125 | 125 | 125 | 125 |
| Primary diameter | | µm | 200 | 200 | 200 | 200 | 200 | 200 |
| Secondary diameter | | µm | 245 | 245 | 245 | 245 | 245 | 245 |
| Young's modulus of primary resin layer | | MPa | 0.2 | 0.1 | 0.2 | 0.3 | 0.5 | 0.2 |
| Pullout force | 23° C. | Kg | 0.45 | 0.28 | 0.45 | 0.66 | 0.90 | 0.45 |
|  | 95° C. | Kg | 0.14 | 0.04 | 0.14 | 0.28 | 0.42 | 0.14 |
| Coating removability | 23° C. | — | A | A | A | A | B | A |

TABLE 3-continued

|  | Unit | Example 1 | Example 2 | Example 3 | Example 4 | Example 5 | Example 6 |
|---|---|---|---|---|---|---|---|
| of single fiber |  |  |  |  |  |  |  |
| Simultaneous removability of ribbon | 95° C. | — | A | A | A | A | B | A |
| Microbend property | dB/km | B 3.1 | A 1.0 | A 1.7 | A 2.9 | B 5.6 | A 2.8 |
| Macrobend property | R7.5 mm × 2 turn | dB | C 0.58 | A 0.02 | A 0.02 | A 0.02 | A 0.02 | B 0.14 |

TABLE 4

|  | Unit | Comparative Example 1 | Comparative Example 2 | Comparative Example 3 | Comparative Example 4 | Comparative Example 5 |
|---|---|---|---|---|---|---|
| Urethane acrylate oligomer of primary resin composition (see Table 1) | — | E | F | E | F | F |
| Refractive index profile (see Table 2) | — | A | A | B | B | C |
| Core diameter | μm | 50 | 50 | 50 | 50 | 50 |
| Cladding diameter | μm | 100 | 100 | 100 | 100 | 100 |
| Non-strippable resin diameter | μm | 125 | 125 | 125 | 125 | 125 |
| Primary diameter | μm | 200 | 200 | 200 | 200 | 200 |
| Secondary diameter | μm | 245 | 245 | 245 | 245 | 245 |
| Young's modulus of primary resin layer | MPa | 0.7 | 0.9 | 0.7 | 0.9 | 0.9 |
| Pullout force 23° C. | kg | 0.97 | 1.15 | 0.97 | 1.15 | 1.15 |
| Pullout force 95° C. | kg | 0.53 | 0.61 | 0.53 | 0.61 | 0.61 |
| Coating removability of single fiber | 23° C. | — | B | C | B | C | C |
| Simultaneous removability of ribbon | 95° C. | — | C | C | C | C | C |
| Microbend property | dB/km | C 11.7 | C 15.0 | C 8.8 | C 12.0 | C 13.7 |
| Macrobend property | R7.5 mm × 2 turn | dB | C 0.58 | C 0.58 | A 0.02 | A 0.02 | B 0.14 |

The optical fiber in each of Examples 1 to 6 had a pullout force at 23° C. of 1.0 kg or less and a pullout force at 95° C. of 0.50 kg or less, and was good in both of the coating removability of the single fiber and simultaneous removability of the ribbon. On the contrary, the optical fiber in each of Comparative Examples 1 to 5 was poor in the coating removability of the single fiber or simultaneous removability of the ribbon.

What is claimed is:

1. An optical fiber comprising:
   a glass fiber including a core and a cladding surrounding the core;
   a non-strippable resin layer that adheres to and covers a surface of the glass fiber;
   a buffer layer that covers the non-strippable resin layer, wherein when pullout force measurement in which a length of 10 mm of each of the glass fiber and the non-strippable resin layer is pulled out at a tensile speed of 5 mm/min from the buffer layer is performed, a pullout force at 23° C. is 1.0 kg or less and a pullout force at 95° C. is 0.50 kg or less,
   wherein the buffer layer includes a primary layer and a secondary layer, and
   the primary layer being comprised of a cured ultraviolet curing resin composition containing an oligomer, a monomer and a photoinitiator, and the ultraviolet curing resin composition containing 30% by mass or more of a one-end-capped oligomer, based on an amount of the entire oligomer,
   the one-end-capped oligomer being a compound in which only one terminal of the oligomer is a reactive terminal one-end-capped oligomer.

2. The optical fiber according to claim 1, wherein the pullout force at 23° C. is 0.70 kg or less and the pullout force at 95° C. is 0.30 kg or less.

3. The optical fiber according to claim 1, wherein the ultraviolet curing resin composition contains 60% by mass or more of the one-end-capped oligomer, based on the amount of the entire oligomer.

4. The optical fiber according to claim 1, wherein a Young's modulus of the non-strippable resin layer is 600 MPa or more at 23° C.

5. The optical fiber according to claim 1, wherein a Young's modulus of the primary layer is 0.5 MPa or more at 23° C.

6. The optical fiber according to claim 1, wherein a Young's modulus of the primary layer is 0.3 MPa or less at 23° C.

7. The optical fiber according to claim 1, wherein the glass fiber is a multimode fiber having a trench portion disposed between the core and the cladding,
   a diameter of the core is 40 to 60 μm, an outer diameter of the cladding is 90 to 110 μm and an outer diameter of the non-strippable resin layer is 122 to 128 μm, and a relative refractive index difference Δcore of the core is 0.7% or more, a relative refractive index difference Δtrench of the trench is −0.2% or less and a width of the trench is 1 μm or more.

8. The optical fiber according to claim 7, wherein the Δtrench is −0.4% or less.

9. An optical fiber ribbon in which a plurality of the optical fibers according to claim 1 are arranged laterally in a row and each of the optical fibers is covered with a ribbon material.

* * * * *